United States Patent
Lee et al.

(10) Patent No.: US 9,301,182 B2
(45) Date of Patent: Mar. 29, 2016

(54) METHOD AND APPARATUS FOR REPORTING MEASUREMENT RESULT IN WIRELESS COMMUNICATION SYSTEM

(75) Inventors: Kyung Jun Lee, Gyeonggi-do (KR);
Sung Duck Chun, Gyeonggi-do (KR);
Seung June Yi, Gyeonggi-do (KR);
Sung Hoon Jung, Gyeonggi-do (KR);
Young Dae Lee, Gyeonggi-do (KR);
Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/882,786

(22) PCT Filed: Oct. 25, 2011

(86) PCT No.: PCT/KR2011/007960
§ 371 (c)(1),
(2), (4) Date: May 1, 2013

(87) PCT Pub. No.: WO2012/060566
PCT Pub. Date: May 10, 2012

(65) Prior Publication Data
US 2013/0329635 A1     Dec. 12, 2013

Related U.S. Application Data (60) Provisional application No. 61/409,517, filed on Nov. 2, 2010, provisional application No. 61/409,918, filed on Nov. 3, 2010, provisional application No. 61/431,410, filed on Jan. 10, 2011.

(51) Int. Cl.
*H04W 24/10*     (2009.01)
*H04W 64/00*     (2009.01)

(52) U.S. Cl.
CPC .......... *H04W 24/10* (2013.01); *H04W 64/00* (2013.01)

(58) Field of Classification Search
CPC ............................ H04W 24/00; H04W 64/00
USPC .......................... 370/254–350; 709/201–213
See application file for complete search history.

(56) References Cited

U.S. PATENT DOCUMENTS 8,155,596 B2 *   4/2012   Eckert et al. .............. 455/67.11
8,391,887 B2 *   3/2013   Suzuki et al. .............. 455/456.1

(Continued)

FOREIGN PATENT DOCUMENTS

| KR | 10-2004-0036863 A | 5/2004 |
| KR | 10-2008-0021462 A | 3/2008 |
| KR | 10-2010-0023055 A | 3/2010 |

OTHER PUBLICATIONS

Search Report issued in corresponding International Patent Application No. PCT/KR2011/007960 dated May 16, 2012.

*Primary Examiner* — Ayaz Sheikh
*Assistant Examiner* — Debebe Asefa
(74) *Attorney, Agent, or Firm* — Morgan, Lewis & Bockius LLP (57) ABSTRACT

Provided an apparatus and a method for reporting a measurement result in a wireless communication system. A terminal receives report conditions and a measurement setting including a report for position information from a base station. When a measurement report is triggered, the terminal determines whether valid position information is available and the measured result is transmitted to the base station. When the valid position information is not available, the measured result includes serving cell information and adjacent cell information.

11 Claims, 7 Drawing Sheets

(56) References Cited

U.S. PATENT DOCUMENTS

| | | | |
|---|---|---|---|
| 8,880,078 B2* | 11/2014 | Kim et al. | 455/443 |
| 2006/0128371 A1* | 6/2006 | Dillon et al. | 455/423 |
| 2006/0128378 A1* | 6/2006 | Fukasawa et al. | 455/428 |
| 2009/0005029 A1* | 1/2009 | Wang et al. | 455/423 |
| 2009/0247150 A1* | 10/2009 | Fischer et al. | 455/425 |
| 2011/0009158 A1 | 1/2011 | Lee et al. | |
| 2011/0250880 A1* | 10/2011 | Olsson | 455/423 |
| 2012/0252471 A1* | 10/2012 | Futaki | 455/450 |

\* cited by examiner

METHOD AND APPARATUS FOR REPORTING MEASUREMENT RESULT IN WIRELESS COMMUNICATION SYSTEM

BACKGROUND OF THE INVENTION

1. Field of the Invention

The present invention relates to wireless communication and, more particularly, to a method and apparatus for reporting a measurement result in a wireless communication system.

2. Related Art

3GPP (3rd Generation Partnership Project) LTE (long term evolution), an advancement of a UMTS (Universal Mobile Telecommunications System) has been introduced as a 3GPP release 8. The 3GPP LTE uses OFDMA (orthogonal frequency division multiple access) in downlink and SC-FDMA (Single Carrier-frequency division multiple access) in uplink. The 3GPP LTE employs MIMO (multiple input multiple output having a maximum of 4 antennas. Recently, 3GPP LTE-A (LTE-Advanced), an advancement of 3GPP LTE, is under discussion.

A terminal continuously performs measurement in order to maintain quality of a radio with a serving cell that serves the terminal. A cell or a frequency as a target of the measurement is considered as a measurement target and a reporting configuration causing a report of a measurement result is independently associated with each measurement target. A terminal performs measurement on measurement targets, and when a reporting configuration is satisfied, the terminal reports the measurement result to a base station (BS).

For coverage optimization, minimization of driving tests (MDT) has been introduced. Coverage differs according to a location of a BS, a disposition of a neighbor building, and a usage environment of a user. In order to produce a coverage map, a business operator must perform a driving test periodically, which causes a great amount of cost and resource. MDT is producing a coverage map by a business operator by using a terminal.

For MDT, a terminal provides location information together with results from cells. However, due to limited battery capacity of the terminal, location information is not always valid. Thus, an erroneous coverage map may be produced due to invalid location information.

SUMMARY OF THE INVENTION

The present invention provides a method and apparatus for reporting a measurement result by a user equipment (UE).

In an aspect, a method for reporting a measurement result by a user equipment in a wireless communication system is provided. The method includes receiving a measurement configuration including reporting of a reporting condition and location information from a base station (BS), the reporting condition indicating that a measurement reporting is triggered according to quality of a serving cell, when the measurement reporting is triggered, determining whether valid location information is available, and transmitting the measurement result to the BS. When the valid location information is not available, the measurement result includes information regarding the serving cell and information regarding a neighbor cell.

When the valid location information is available, the measurement result may include the information regarding the serving cell and the valid location information.

The information regarding the serving cell may include a quality value of the serving cell and an identification (ID) of the serving cell, and the information regarding the neighbor cell may include a quality value of the neighbor cell and an ID of the neighbor cell.

The reporting condition may indicate that the measurement reporting is triggered when the quality value of the serving cell is lower than a threshold value.

The reporting condition may indicate that the measurement reporting is triggered when the quality value of the serving cell is higher than a threshold value.

In another aspect, a user equipment configured for reporting a measurement report in a wireless communication system is provided. The user equipment includes a radio frequency (RF) unit configured to transmit and receive a radio signal, and a processor connected to the RF unit and configured to receive a measurement configuration including reporting of a reporting condition and location information from a base station (BS), the reporting condition indicating that measurement reporting is triggered according to quality of a serving cell, when the measurement report is triggered, determine whether valid location information is available, and transmit a measurement result to the BS. When the valid location information is not available, the measurement result includes information regarding the serving cell and information regarding a neighbor cell.

A network can accurately calculate a cell measurement location, and a coverage map having high quality can be obtained.

DESCRIPTION OF EXEMPLARY EMBODIMENTS

Figure 1:
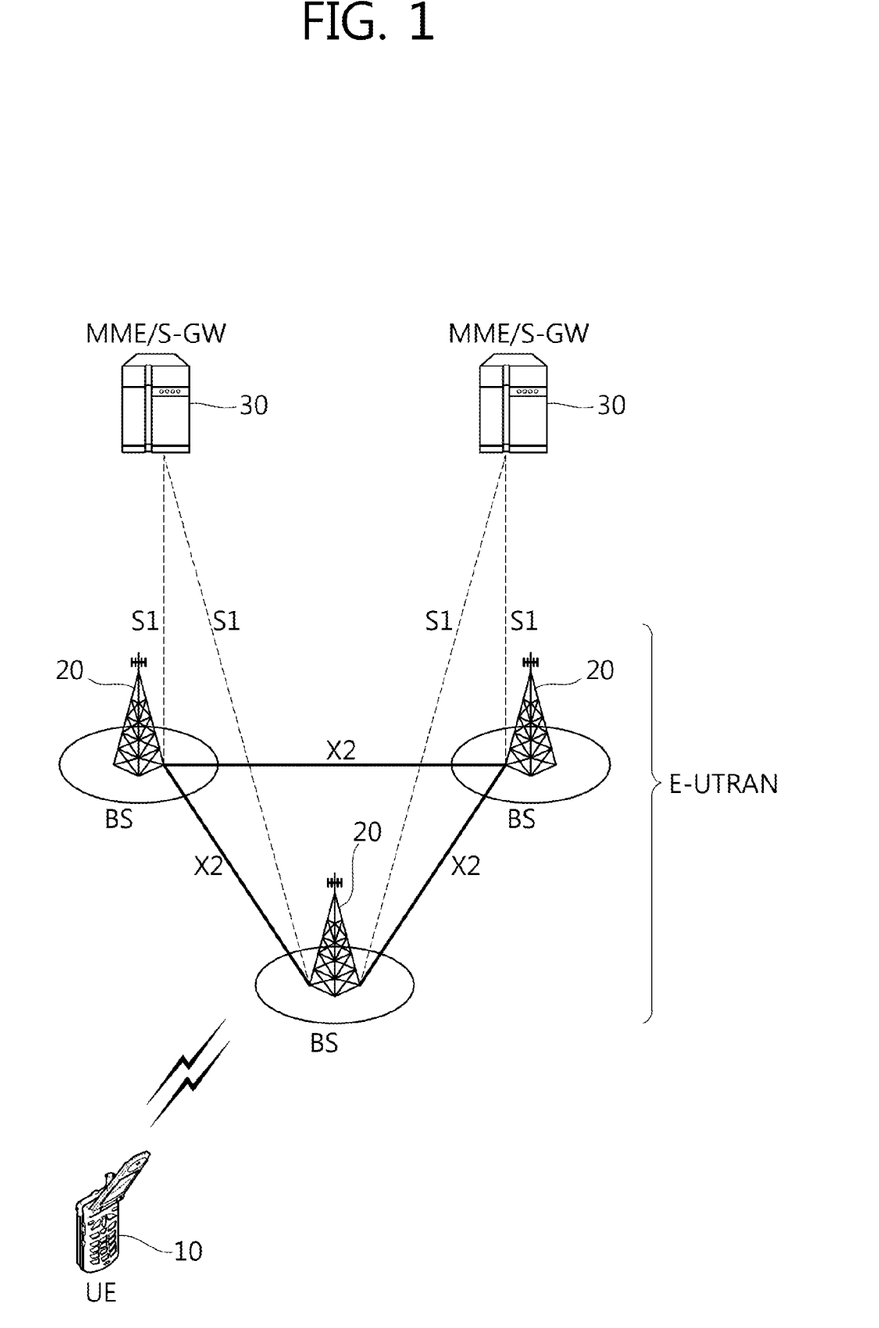
FIG. 1 is a view illustrating a wireless communication system to which the present invention is applicable.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
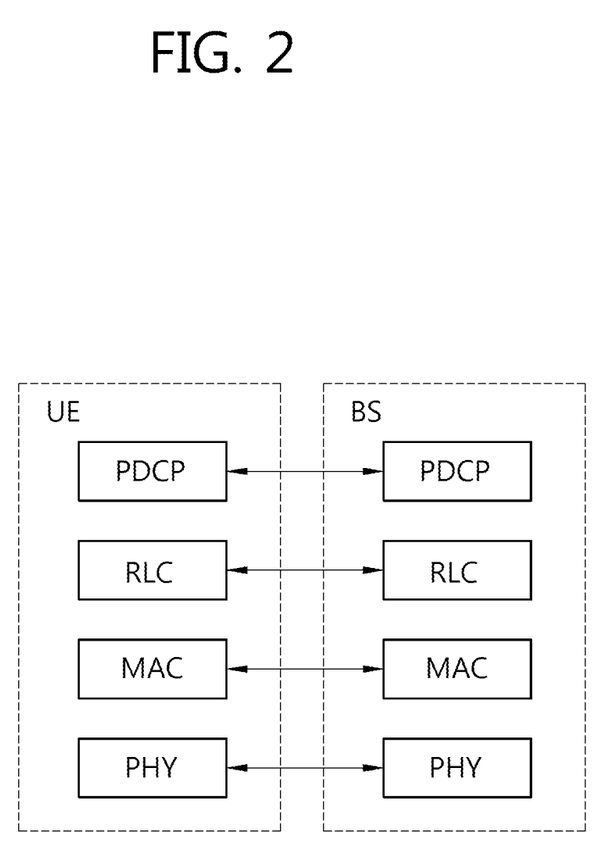
FIG. 2 is a diagram showing a radio protocol architecture for a user plane.
Figure 3:
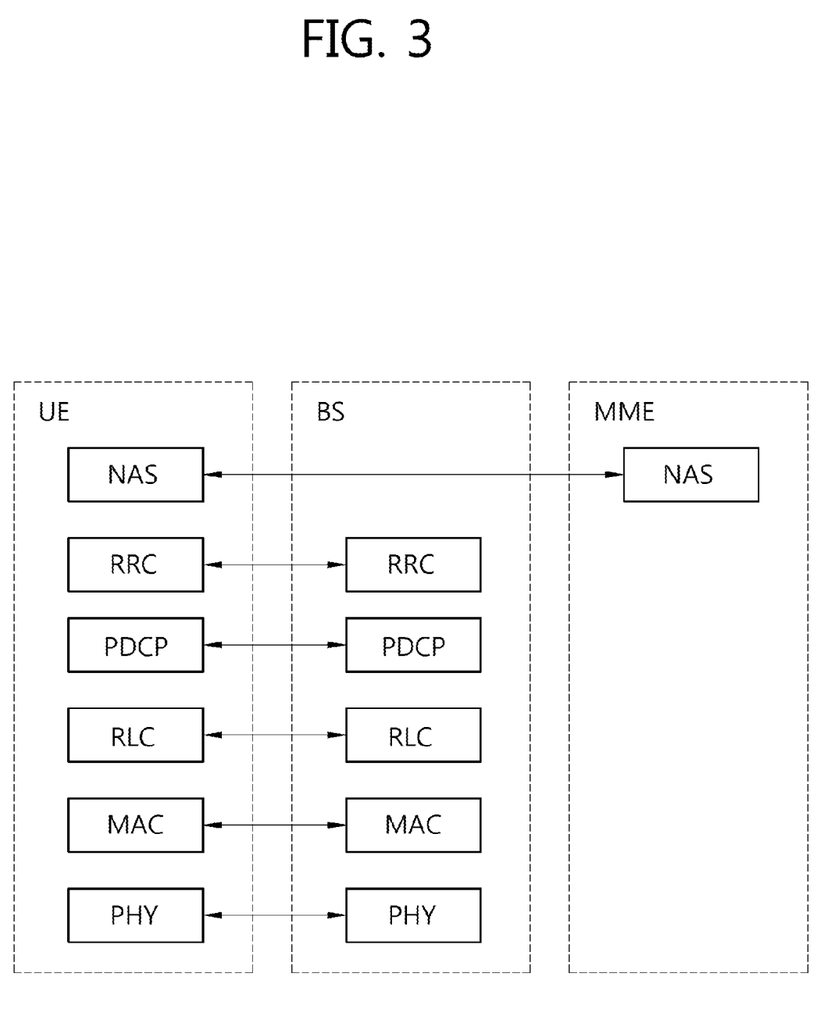
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 4:
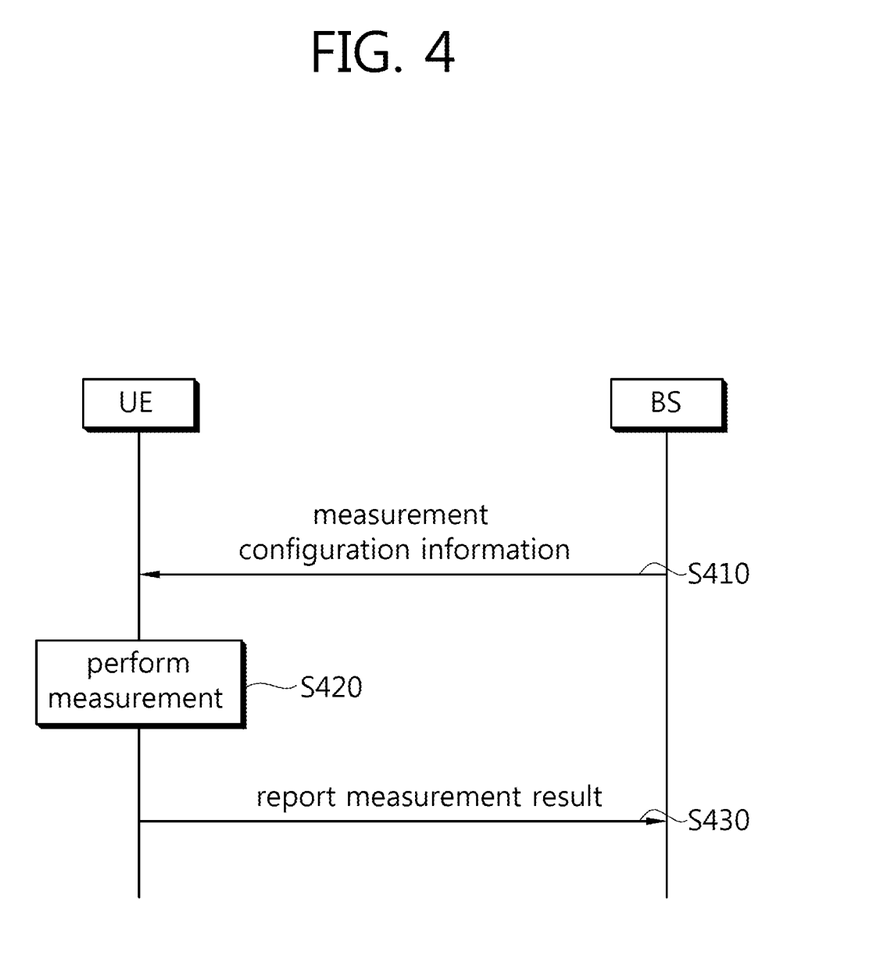
FIG. 4 is a flow chart showing a conventional method of performing measurement.

FIG. 4 is a flowchart showing a conventional method of performing measurement.

A UE receives measurement configuration information from a BS (step S410). A message including the measurement configuration information is referred to as a measurement configuration message. The UE performs measurement based on the measurement configuration information (step S420). If a measurement result satisfies a reporting condition included in the measurement configuration information, the UE reports the measurement result to the BS (step S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.7.0 (2009-09).

TABLE 1

| Event | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 5:
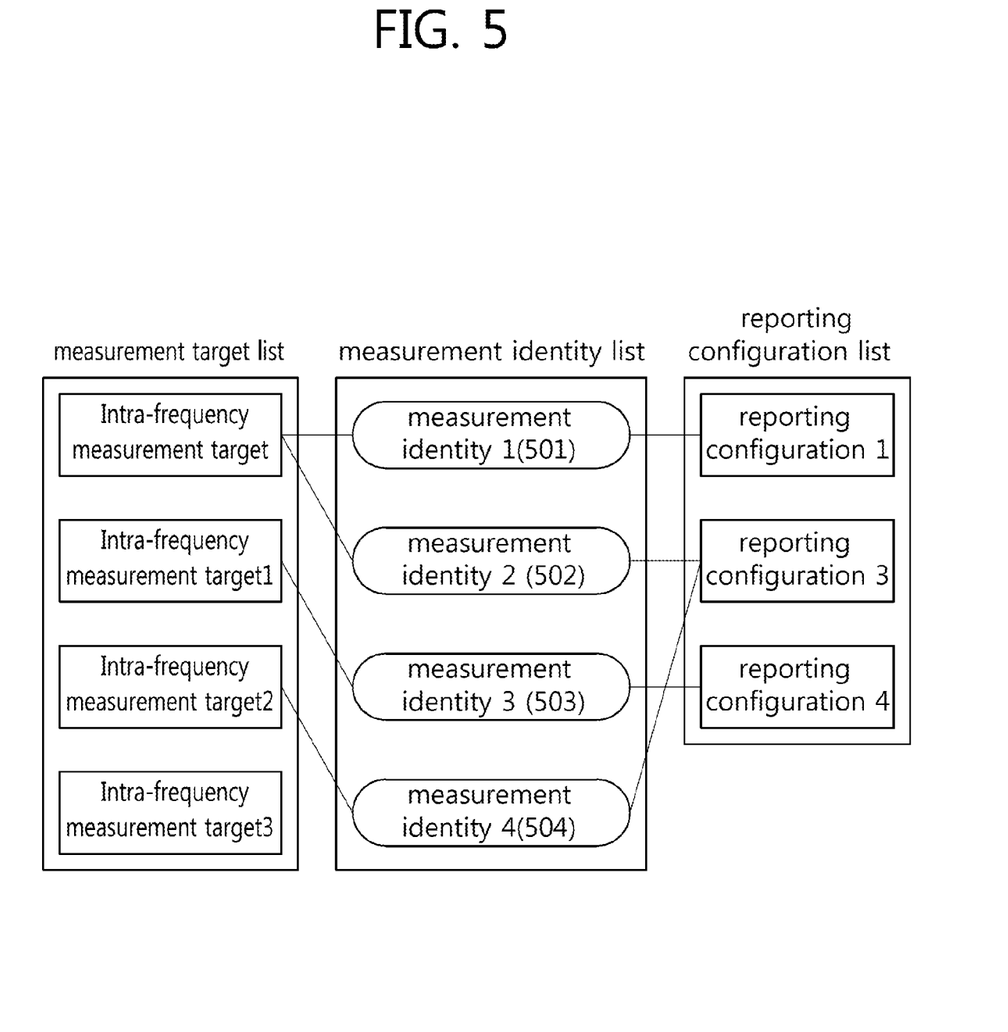
FIG. 5 shows an example of a measurement configuration set in a UE.

FIG. 5 shows an example of a measurement configuration assigned to a UE.

First, a measurement identity1 501 associates an intra-frequency measurement object with a reporting configuration 1. The UE performs intra-frequency measurement. The reporting configuration 1 is used to determine a reporting type and a criterion for reporting a measurement result.

A measurement identity2 502 is associated with the intra-frequency measurement object similarly to the measurement identifier1 501, and associates the intra-frequency measurement object with a reporting configuration 2. The UE performs intra-frequency measurement. The reporting configuration 2 is used to determine a reporting format and a criterion for reporting a measurement result.

By using the measurement identity1 501 and the measurement identity2 502, the UE transmits a measurement result even if the measurement result on the intra-frequency measurement object satisfies any one of the reporting configuration 1 and the reporting configuration 2.

A measurement identity3 503 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 504 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

After receiving the measurement configuration, the UE performs measurements for the measurement object associated with the measurement identity. The UE determines whether the measurement result satisfies the reporting condition based on the reporting configuration included in the measurement configuration. If the reporting condition is satisfied, the UE sends measurement reporting message which may include measurement report information.

Measurement reporting message may include the following information.

a measurement identity which is associated with the reporting configuration satisfying the reporting condition. The BS can confirm that the UE transmits measurement reporting by which reporting configuration is satisfied based on the measurement identity.

a quality of the serving cell which represents the quality value of the measured serving cell.

information of neighbor cell which includes an identity of the neighbor cell and a quality of the neighbor cell. The identity of the neighbor cell includes a physical cell identity of the neighbor cell which satisfies the reporting condition.

Hereinafter, MDT (Minimization of Driving Tests) will be described.

MDT is performing testing by a service provider (or an operator) by using a UE, instead of a vehicle, for coverage optimization. Coverage varies according to a location of a BS, an arrangement of neighboring buildings, and a usage environment of a user. Thus, a service provider needs to perform a driving test periodically, which incurs high cost and requires a great deal of resource. MDT is measuring coverage by a service provider by using a UE.

MDT may be divided into logged MDT and immediate MDT. According to logged MDT, a UE performs MDT measurement and subsequently transmits logged measurement to a network at a particular timing. According to immediate MDT, a UE performs MDT measurement and transfer the measurement to a network when a reporting condition is met. In the case of the logged MDT, MDT measurement is performed in an RRC idle mode, while in the case of the immediate MDT, MDT measurement is performed in an RRC connected mode.

A quality value measured for MDT includes a quality value of a serving cell and that of a neighbor cell. The quality value may include a value well known to a person in the art, such as RSRP (Reference Signal Received Power) or RSRQ (Reference Signal Received Quality).

A service provider may create a coverage map indicating service availability and a distribution of services over the general regions in which the service provider provides services by synthesizing the MDT measurements received from several UEs, and utilize it in network operation and optimization. For example, when a coverage issue of a particular area is reported from a UE, the service provider may increase transmission power of a BS providing a service of the corresponding region to extend coverage of a corresponding area cell.

In order to trigger measurement report for immediate MDT, 'Event A2', periodical report, or the like, may be used. As shown in Table 1, according to Event A2, quality of a serving cell is measured, and when the quality of the serving cell is smaller than a threshold value, quality measurement result of the serving cell is reported. Thus, in reporting measurement, measurement results of neighbor cells are not included.

When location information of a UE is not included in the measurement results, a network must calculate coverage by using only quality of the serving cell. In this case, since a location of the UE is inaccurately recognized, it is difficult to obtain a quality coverage map. Also, since network optimization is performed on the basis of the inaccurate result, network performance may be degraded.

According to the proposed invention, a UE receives reporting configuration instructing that location information should be reported together with location information in the event of measurement reporting of a serving cell, and when there is no valid location information, the UE includes information regarding a neighbor cell in measurement reporting, and reports the same.

Figure 6:
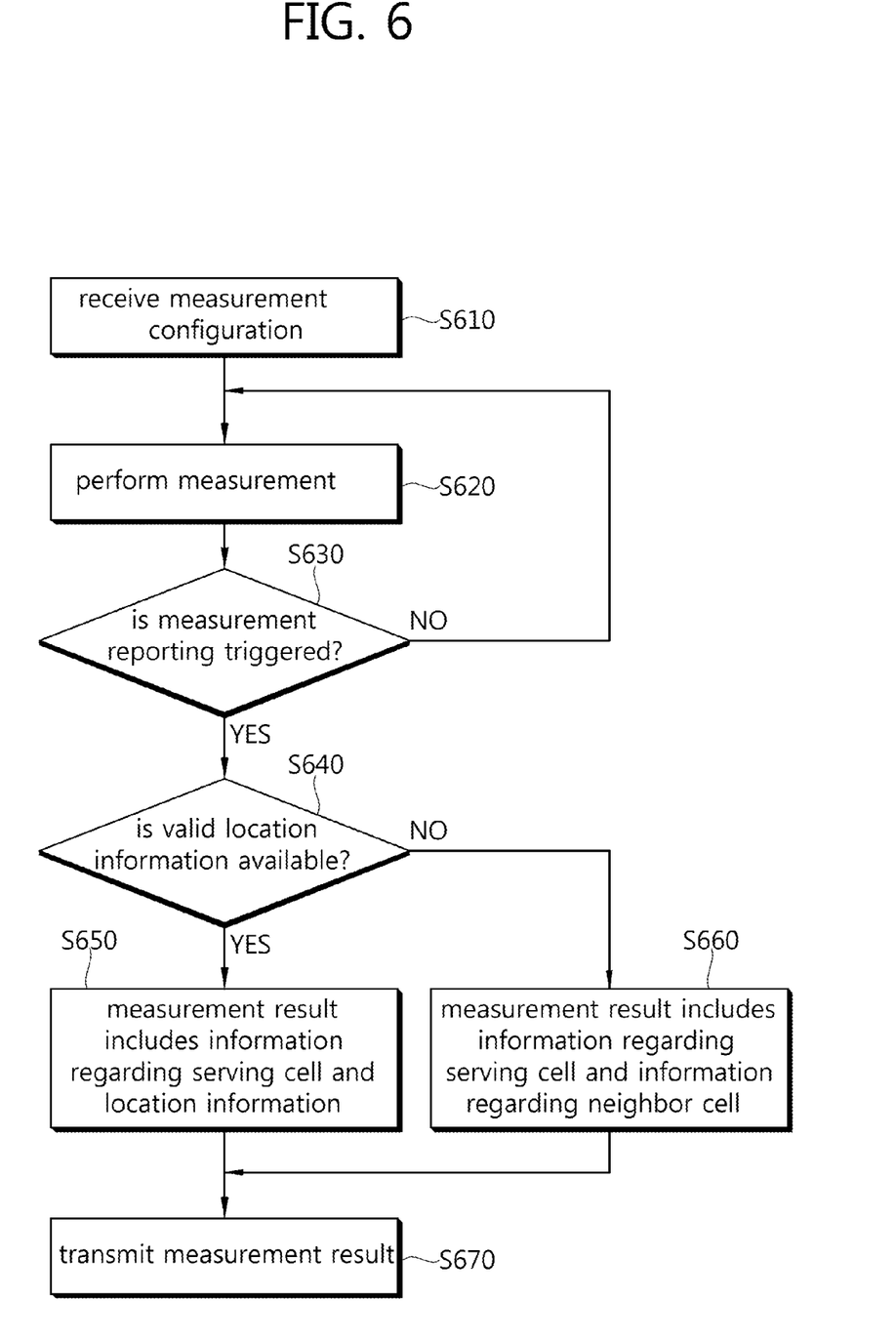
FIG. 6 is a flow chart illustrating a method for reporting a measurement result according to an embodiment of the present invention.

FIG. 6 is a flow chart illustrating a method for reporting a measurement result according to an embodiment of the present invention. This method may be performed by a UE.

A UE receives a measurement configuration from a BS (S610). The measurement configuration includes a report condition and an indicator indicating reporting of location information.

The report condition may indicate that measurement report is triggered according to quality of a serving cell. When a quality value of the serving cell is lower than a threshold value, the report condition may indicate that measurement reporting is triggered. Alternatively, when a quality value of the serving cell is higher than the threshold value, the report condition may indicate that measurement reporting is triggered One or more serving cells may exist. A threshold by which measurement reporting is triggered may be given for each serving cell or a single threshold value may be commonly used.

Measurement configuration may be received through an RRC message and may be valid only while an RRC connected state is currently maintained. When a state is changed from the RRC connected state into an RRC idle state, the measurement configuration may be discarded.

The measurement configuration includes an indicator indicating reporting of location information. When the indicator is included, the measurement configuration may be a measurement configuration for immediate MDT. Location information is information regarding a location of a UE while measurement is being performed. The UE may obtain location information on the basis of GNSS (Global Navigation Satellite System). Alternatively, the UE may obtain location information on the basis of OTDOA (Observed Time Difference of Arrival) or LPP (LTE Positioning Protocol) described in Paragraph 5 of 3GPP TS 36.355 V9.2.1 (2010-06).

The location information may include at least any one of latitude, longitude, altitude, and velocity.

The UE performs measurement according to the measurement configuration (S620). Measurement may be performed in an RRC connected state.

The UE determines whether measurement reporting is triggered (S630).

When measurement reporting is triggered, the UE determines whether valid location information is available (S640). The UE may determine that location information obtained within a particular valid time is valid. Alternatively, when there is location information which has not been included in previous measurement reporting even once, the UE may determine that the location information is valid.

When the valid location information is available, the measurement result includes the information regarding the serving cell and the valid location information (S650). When the valid location information is not available, the measurement result includes information regarding the serving cell and information regarding a neighbor cell (S660).

The information regarding the serving cell may include a quality value of the serving cell and an identification (ID) of the serving cell. The information regarding a neighbor cell may include a quality value of the neighbor cell and an ID of the neighbor cell.

The neighbor cell may be a neighbor cell having the same frequency as that of the serving cell (i.e., Intra-frequency neighbor cell) and the UE has cell quality information including an already measured result. Alternatively, the neighbor cell may be a neighbor cell having a frequency different from that of the serving cell (i.e., an inter-frequency neighbor cell) or a neighbor cell of a different RAT (i.e., an inter-RAT neighbor cell) and the UE has cell quality information including an already measured result.

The UE transmits the measurement result to the BS (S670).

When the measurement reporting is triggered according to quality of the serving cell, if there is no valid location information, the UE includes the information regarding the neighbor cell in the measurement result. Even without information regarding a location of the UE, the BS may accurately estimate a location of the UE on the basis of the neighbor cell information. Thus, the BS may obtain a coverage map having higher quality.

Figure 7:
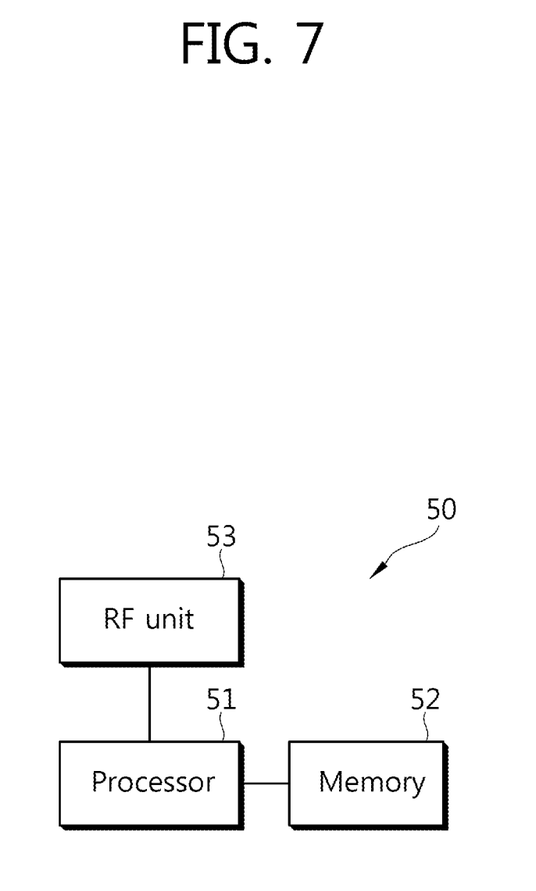
FIG. 7 is a block diagram illustrating a wireless device implementing an embodiment of the present invention.

FIG. 7 is a block diagram illustrating a wireless device implementing an embodiment of the present invention.

A UE 50 includes a processor 51, a memory 52, and a radio frequency (RF) unit 53. The memory 52 connected to the processor 51 stores various types of information for driving the processor 51. The RF unit 53 connected to the processor 51 transmits and/or receives a radio signal. The processor 51 implements proposed functions, processes, and/or methods. An operation of the UE in the embodiment of FIG. 6 may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a measurement result by a user equipment (UE) in a wireless communication system, the method comprising: receiving, by the UE from a base station (BS), a measurement configuration including a reporting condition, the reporting condition indicating that a measurement reporting is triggered according to quality of a serving cell, the received measurement configuration being discarded when a state of the UE is changed from a radio resource control (RRC) connected state to an RRC idle state; when the measurement reporting is triggered, determining, by the UE, whether location information is available, the location information being determined to be available if a position of UE can be obtained based on a global navigation satellite system (GNSS); and transmitting, by the UE, the measurement result to the BS, wherein, if it is determined that the location information is not available, the measurement result includes information regarding the serving cell and information regarding a neighbor cell, wherein the reporting condition indicates that the measurement reporting is triggered when the quality value of the serving cell is lower or higher than a threshold value, wherein the information regarding the serving cell includes a quality value of the serving cell and an identification (ID) of the serving cell, and wherein the information regarding the neighbor cell includes a quality value of the neighbor cell and an ID of the neighbor cell.

2. The method of claim 1, wherein when the location information is available, the measurement result includes the information regarding the serving cell and the location information.

3. The method of claim 1, wherein the location information includes at least one of: latitude of the UE, a longitude of the UE, and an altitude of the UE.

4. The method of claim 1, wherein the location information is obtained on the basis of global navigation satellite system (GNSS).

5. The method of claim 1, wherein the measurement configuration is for minimization of driving tests (MDT).

6. The method of claim 5, wherein the measurement result is measured in the radio resource control (RRC) connected state.

7. A user equipment configured for reporting a measurement report in a wireless communication system, the user equipment comprising: a radio frequency (RF) unit configured to transmit and receive a radio signal; and a processor connected to the RF unit and configured to: receive a measurement configuration including a reporting condition from a base station (BS), the reporting condition indicating that measurement reporting is triggered according to quality of a serving cell, the received measurement configuration being discarded when a state of the UE is changed from a radio resource control (RRC) connected state to an RRC idle state; when the measurement report is triggered, determine whether location information is available, the location information being determined to be available if a position of UE can be obtained based on a global navigation satellite system (GNSS); and transmit a measurement result to the BS, and wherein, if it is determined that the location information is not available, the measurement result includes information regarding the serving cell and information regarding a neighbor cell, wherein the reporting condition indicates that the measurement reporting is triggered when the quality value of the serving cell is lower or higher than a threshold value, wherein the information regarding the serving cell includes a quality value of the serving cell and an identification (ID) of the serving cell, and wherein the information regarding the neighbor cell includes a quality value of the neighbor cell and an ID of the neighbor cell.

8. The user equipment of claim 7, wherein when the location information is available, the measurement result includes the information regarding the serving cell and the location information.

9. The user equipment of claim 7, wherein when the quality value of the serving cell is lower than a threshold value, the reporting condition indicates that the measurement reporting is triggered.

10. The user equipment of claim 7, wherein the location information includes at least any one of latitude of the UE, a longitude of the UE, and an altitude of the UE.

11. The user equipment of claim 7, wherein the measurement configuration is for minimization of driving tests (MDT).

* * * * *